US009673346B1

(12) United States Patent
Martin

(10) Patent No.: US 9,673,346 B1
(45) Date of Patent: Jun. 6, 2017

(54) OPTIMALLY-ANGLEABLE SOLAR POWERED AIR SYSTEMS

(71) Applicant: Dennis Martin, Hanover, PA (US)

(72) Inventor: Dennis Martin, Hanover, PA (US)

( * ) Notice: Subject to any disclaimer, the term of this patent is extended or adjusted under 35 U.S.C. 154(b) by 660 days.

(21) Appl. No.: 14/168,111

(22) Filed: Jan. 30, 2014

Related U.S. Application Data

(60) Provisional application No. 61/818,125, filed on May 1, 2013.

(51) Int. Cl.
*H01L 31/058* (2006.01)
*H01L 31/0525* (2014.01)
*F24J 2/00* (2014.01)

(52) U.S. Cl.
CPC .......... *H01L 31/058* (2013.01); *F24J 2/0007* (2013.01)

(58) Field of Classification Search
CPC .................................................. H01L 31/058
USPC ......................................................... 454/228
See application file for complete search history.

(56) References Cited

U.S. PATENT DOCUMENTS

| D288,711 | S | 3/1987 | Atkinson | |
|---|---|---|---|---|
| 5,081,982 | A | 1/1992 | MacKenzie | |
| 5,488,801 | A * | 2/1996 | Nix | A01G 9/243 |
| | | | | 29/401.1 |
| 6,085,475 | A * | 7/2000 | Parks | E04H 9/12 |
| | | | | 52/169.14 |
| 6,234,166 | B1 | 5/2001 | Katsir | |
| 6,494,200 | B1 * | 12/2002 | Rylewski | F24J 2/0444 |
| | | | | 126/631 |
| 6,695,692 | B1 * | 2/2004 | York | E04D 13/0325 |
| | | | | 454/199 |
| 6,899,098 | B2 * | 5/2005 | Durbin | F24J 2/0433 |
| | | | | 126/629 |
| 7,631,641 | B1 | 12/2009 | Goldman | |
| 8,191,547 | B2 * | 6/2012 | Pellegrino | F24J 2/0433 |
| | | | | 126/624 |
| 8,863,741 | B2 * | 10/2014 | MacKay | F24J 2/05 |
| | | | | 126/600 |
| 9,234,666 | B2 * | 1/2016 | Cinier | F24D 5/04 |
| 2001/0031618 | A1 * | 10/2001 | Wilson | B60H 1/00257 |
| | | | | 454/119 |
| 2005/0241593 | A1 * | 11/2005 | Kaura | A01K 1/0088 |
| | | | | 119/496 |
| 2006/0000558 | A1 * | 1/2006 | Fennell | E06B 9/42 |
| | | | | 160/7 |
| 2006/0277675 | A1 * | 12/2006 | Tinnell | E04H 1/1216 |
| | | | | 4/477 |

(Continued)

*Primary Examiner* — Steven B McAllister
*Assistant Examiner* — Samantha Miller
(74) *Attorney, Agent, or Firm* — RG Patent Consulting, LLC; Rachel Gilboy

(57) ABSTRACT

An optimally-angleable solar powered air system is a portable indoor solar heating unit that may stand upright or may be mounted to a door or window. The optimally-angleable solar powered air system has a frame having a solar panel mounted to a first side and a fan mounted to a second side of the frame. In use, the frame may stand inside a room at an angle facing the sun via a removable handle such that the solar panel is able to capture solar energy. The system may then convert solar energy into usable power to power the fan. The second side of the frame includes an air deflector which may direct airflow outwardly from the second side of the frame into the room.

16 Claims, 6 Drawing Sheets

(56) References Cited

U.S. PATENT DOCUMENTS

| | | | |
|---|---|---|---|
| 2007/0157890 A1* | 7/2007 | Kaura | A01K 1/0088 119/496 |
| 2008/0098672 A1* | 5/2008 | O'Hagin | E04D 1/30 52/173.3 |
| 2009/0084507 A1* | 4/2009 | Tescher | E06B 3/485 160/44 |
| 2012/0090599 A1 | 4/2012 | Parana | |
| 2012/0312293 A1 | 12/2012 | Vachon | |

* cited by examiner

OPTIMALLY-ANGLEABLE SOLAR POWERED AIR SYSTEMS

CROSS-REFERENCE TO RELATED APPLICATION

The present application is related to and claims priority from prior provisional application Ser. No. 61/818,125, filed May 1, 2013 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of solar panel devices and more specifically relates to flat panel inside room technology for providing an energy efficient means to blow air to vary the temperature therein.

2. Description of the Related Art

Modern society uses buildings to provide accommodation and storage for occupants and their possessions. Buildings may fall into residential and commercial classes. These buildings are often provided with power and/or temperature regulating means to provide comfort to the individuals and suitable storage temperatures items. Many furnaces are powered via natural gas or propane. These furnaces require a utility service to be piped in which may be expensive, especially in remote locations.

Solar thermal energy (STE) is a technology for harnessing solar energy for thermal energy (heat). Solar thermal collectors are classified by the United States Energy Information Administration as low-, medium-, or high-temperature collectors. Low-temperature collectors are flat plates generally used to heat swimming pools. Medium-temperature collectors are also usually flat plates but are used for heating water or air for residential and commercial use. High-temperature collectors concentrate sunlight using mirrors or lenses and are generally used for electric power production.

Solar energy is a powerful, cost-effective option. Solar heating & cooling technologies collect the thermal energy from the sun and use this heat to provide hot water, space heating, cooling, and pool heating for residential, commercial, and industrial applications. These technologies displace the need to use electricity or natural gas. However, it may be difficult to utilize solar heat in many rooms or homes. If a person does not have solar panels or the means to install them, solar energy may not be an option. It may also be challenging to utilize solar energy in all areas of a building given the limited portability of conventional devices.

Various attempts have been made to solve the above-mentioned problems such as those found in U.S. Pub. No. 2012/0312293 to Christian Vachon, U.S. Pub. No. 2012/0090599 to Jeffrey Thomas Parana, U.S. Pat. No. 7,631,641 to David A. Goldman and Michael I. Goldman, U.S. Pat. No. 5,081,982 to John A. MacKenzie, U.S. Pat. No. 6,234,166 to Dina Katsir, and U.S. Pat. No. D288,711 to Donald A. Atkinson. This art is representative of solar panel devices. None of the above inventions and patents, taken either singly or in combination, is seen to describe the invention as claimed.

Ideally, a solar energy powered air blowing system should provide an efficient way to blow air into an interior area which may be supported upright or mounted to a door or window for varied and convenient use. The solar energy powered air blowing system should utilize safer technology than traditional space heaters and should be attachable to doors and windows in a way that still may allow light to enter therein. Further, it is desirable that the system be lightweight, and compact for convenient storage and portability, and, yet would operate reliably and be manufactured at a modest expense. Thus, a need exists for a reliable solar energy powered air blowing system to avoid the above-mentioned problems.

BRIEF SUMMARY OF THE INVENTION

In view of the foregoing disadvantages inherent in the known solar panel air regulating device art, the present invention provides a novel solar energy powered air blowing system utilizing safer technology than traditional space fans; one which is energy efficient. The general purpose of the present invention, which will be described subsequently in greater detail, is to provide an indoor solar heating unit that may stand upright or mount to a door or window. The invention may comprise a thin, flat device that stands upright at approximately a 30° angle.

An optimally-angleable solar powered air system is disclosed herein, in a preferred embodiment, comprising a frame constructed of lightweight material for ease of mobility and an air blowing and directing assembly. The frame may comprise a hem of approximately 0.5" for minimizing hand injury to a user when handling the frame. The frame may have a first side comprising black heat absorbent material and a second side comprising, in part, the air blowing and directing assembly. The air blowing and directing assembly may comprise a fan housing, at least one fan comprising a 12 volt fan, a fan housing cover comprising a snap-on cover, a solar energy converter, a power supply, and an air deflector. The optimally-angleable solar powered air blowing system may comprise in combination the frame and the air blowing and directing assembly. The air blowing and directing assembly may comprise in operable combination the fan housing, the at least one fan, the fan housing cover, the solar energy converter, the power supply, and the air deflector.

The frame may further comprise at least one solar panel, a stationary handle, a removable handle, an air deflector receiver, and at least one pad. The solar panel may comprise a solar energy receiver for receiving solar energy. The at least one solar panel is mounted to the first side of the frame. The stationary handle is affixed to the second side of the frame. The removable handle is removably mountable to the second side of the frame and is able to be rotated through an arc of less than 180 degrees. The removable handle, when rotated upwardly, is able to provide a hanging means to support the optimally-angleable solar powered air blowing system against a vertical-surface. The removable handle, when rotated downwardly, is able to provide a standing means to support the optimally-angleable solar powered air blowing system on a horizontal-surface. In addition, the removable handle, when rotated inwardly such that the removable handle is flush against the second side of the frame, may enable the optimally-angleable solar powered air blowing system to be easily storable in a folded condition. The frame may comprise in combination the at least one solar panel, the stationary handle, the removable handle, the air deflector receiver, and the at least one pad. Further, the frame may comprise a strap for hanging the frame to the vertical-surface that is translucent. Preferably, the frame is hangable to the vertical-surface via the strap such that the first side of the frame is angled at approximately 30 degrees for optimal absorption of the solar energy by the at least one solar panel.

With reference now to the air blowing and directing assembly, the air deflector receiver is preferably affixed to the second side of the frame. The receiver may comprise a pair of horizontally aligned tracks with a width equivalent to the air deflector. With reference to the at least one pad, the optimally-angleable solar powered air system may comprise a plurality of pads, each serving as a buffer between the frame and a ground surface. The plurality of pads may be installable to a bottom surface of the frame. The fan housing may comprise a secure enclosure which may contain the fan, the solar energy converter, and the power supply. The fan housing is mounted to the second side of the frame relative in location on the frame to the at least one solar panel mounted to the first side of the frame. The fan housing cover may envelope the fan housing thereby providing additional protection to the fan and integral components.

In use, the solar panel may be in wired communication with the solar energy converter via a solar energy cable. The solar energy converter may be in wired communication with the power supply via a power cable. The solar panel may collect solar energy emitted by the sun. The solar panel may transfer the solar energy to the solar energy converter via the at least one solar energy cable, and the solar energy converter converts the solar energy to into a 'usable-power' (powering means). In the preferred embodiment of the present invention, the usable-power may comprise 12 volt electricity for operating the fan comprising a 12 volt fan.

The usable-power for the power supply is transferred from the solar energy converter; the usable-power enables the power supply to provide operating power to the fan thereby causing the fan, when activated, to blow air in an upward direction towards the air deflector. The air deflector is slideably insertable into the air deflector receiver creating a flow-path, and the air deflector deflects the air blowing in the upward direction outwardly away from the second side of the frame. It may be appreciated that the optimally-angleable solar powered air blowing system may blow the air into an interior volume and may provide a self-powered air blower for cost-effectively circulating the air throughout the interior volume (of a room).

The optimally-angleable solar powered air system may further comprisie a kit which may include the frame comprising the solar panel, the stationary handle, the removable handle, the air deflector receiver, the at least one pad, and the air blowing and directing assembly. The device is conveniently portable.

A method of using the optimally-angleable solar powered air system may comprise the steps of: pulling a removable handle outward from a second side of a frame; standing the frame upright such that a first side of the frame faces the sun at an optimal angle for receiving sun light 30 degree angle; powering a fan mounted to a second side of the frame; and blowing air into an interior volume via an air deflector. The method of using the optimally-angleable solar powered air system may further comprise optional steps of hanging the frame to a door via a strap; and hanging the frame to a window via the strap.

The present invention holds significant improvements and serves as a portable, self-standing or hanging solar energized air blowing device. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, optimally-angleable solar powered air systems, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to an optimally-angleable solar powered air system and more particularly to a flat panel inside room technology for providing an energy efficient way to blow air into an area having an interior volume.

Generally speaking, optimally-angleable solar powered air systems may comprise an indoor solar heating unit that may stand upright or mount to a door or window. The invention may comprise a thin, flat device that stands upright at about a 30° angle. The design may be constructed from metal or another suitable material. The device's motor box may be constructed from plastic or another appropriate material. The device may have a 0.5" hem on all four sides so that there are no sharp angles. There may be a handle on the back of the device at the top and a corresponding strap for hanging, and a fan on the back of the device at the bottom. The fan may have a snap-on cover. The device may incorporate air deflectors that slide out at the top to direct air throughout the room or area. There may be a detachable stand for holding the device steady when it is being used in a free-standing manner.

Figure 1:
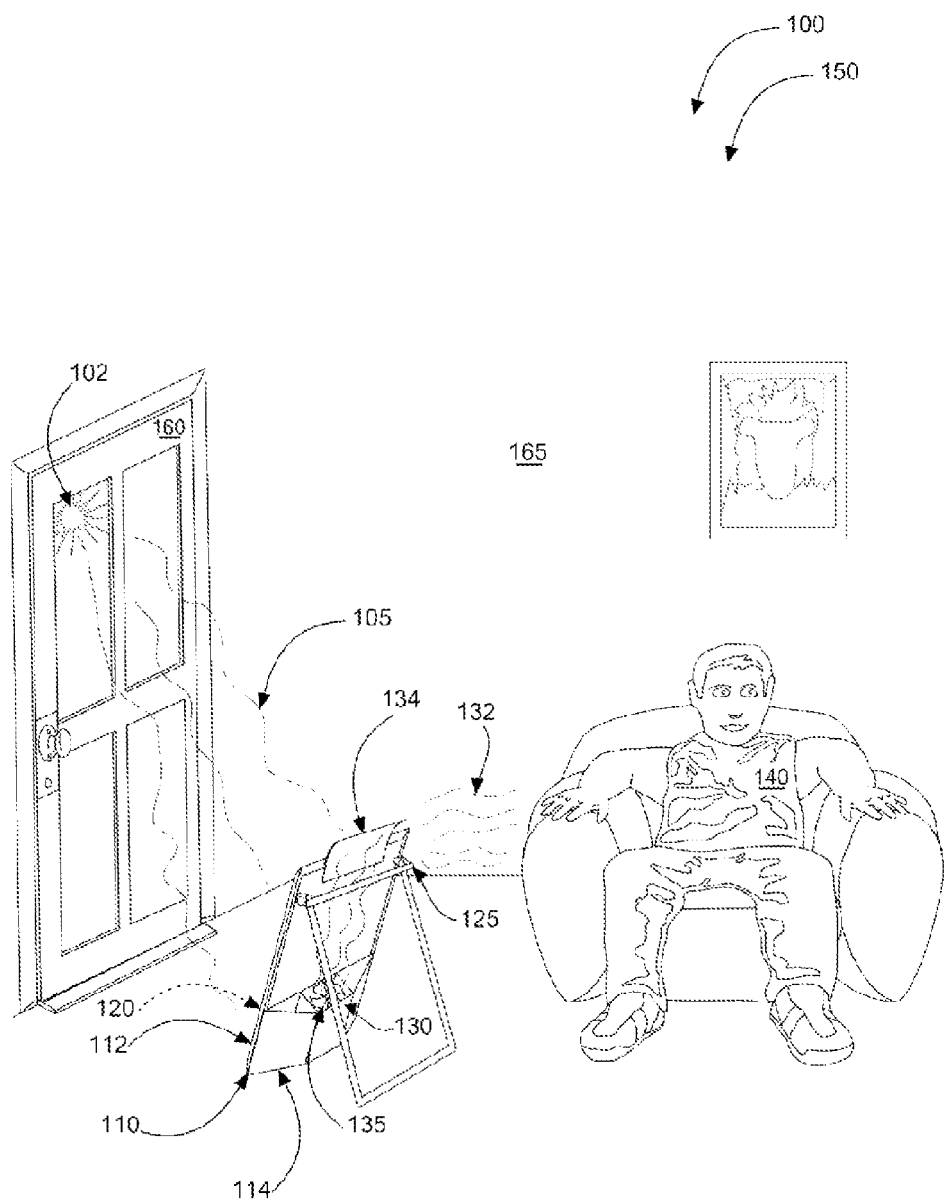
FIG. 1 shows a perspective view illustrating an optimally-angleable solar powered air system during an 'in-use' condition according to an embodiment of the present invention.

Referring to the drawings by numerals of reference there is shown in FIG. 1, optimally-angleable solar powered air systems 100 during 'in-use' condition 150 according to an embodiment of the present invention. As shown, optimally-angleable solar powered air blowing systems 100 may comprise frame 110 having first side 112 and second side 114. First side 112 of frame 110 may comprise at least one solar panel 120. Solar panel 120 may further comprise solar energy receiver 235. In continuing to refer to frame 110, second side may comprise stationary handle 225, a movable handle 125, air deflector receiver 245, and at least one pad 220.

Optimally-angleable solar powered air systems 100 may further comprise air blowing and directing assembly 130. In one embodiment, air blowing and directing assembly 130 may comprise fan housing 230, fan 135, fan housing cover 240, solar energy converter 235, power supply 260, and air deflector 134. It should be noted that optimally-angleable solar powered air blowing systems 100 may comprise in combination frame 110 and air blowing and directing assembly 130. As better seen in FIG. 2A, frame 110 comprises in combination at least one solar panel 120, stationary handle 225, movable handle 125, air deflector receiver 245, and pad 220. During 'in-use' condition 150, sun 102 may emit solar energy 105 which may come into contact with first side 112 of frame 110 comprising solar panel 120. Solar panel 120 may receive and convert solar energy 105 into re-usable power for providing operating power to power supply 260 of air blowing and directing assembly 130. As shown in FIG. 1, fan 135 of air blowing and directing assembly 130 may be powered by the re-usable power in order to generate air flow 132 into interior volume 165 (here comprising a room inside a home). Air flow 132 may be guided away from frame 110 via air deflector 134 and toward user 140.

In continuing to refer to FIG. 1, showing optimally-angleable solar powered air systems 100 during 'in-use' condition 150, solar panel 120 may be mounted to first side 112 of frame 110. First side 112 of frame 110 preferably faces outward toward sun 102 to receive solar energy 105. As may further be seen, stationary handle 225 may be affixed to second side 114 of frame 110. Movable handle 125 may be removably mountable to second side 114 of frame 110. Furthermore, air deflector receiver 245 may be affixed to second side 114 of frame 110. Pad 220 may comprise a buffer between frame 110 and a ground surface and may be installable to a bottom surface of frame 110.

During 'in-use' condition 150, solar panel 120 is in wired communication with solar energy converter 235 via at least one solar energy cable 310. Solar energy converter 235 is in wired communication with power supply 260 via at least one power cable. As may be seen in FIG. 1, solar panel 120 collects solar energy 105 emitted by sun 102. Solar panel 120 may transfer solar energy 105 to solar energy converter 235 via solar energy cable(s) 310. Solar energy converter 235 converts solar energy 105 into a usable-power. Then, solar energy converter 235 transfers usable-power to power supply 260. It should be appreciated that usable-power enables power supply 260 to provide operating power to fan 135 thereby causing fan 135, when activated, to blow air in an upward direction towards air deflector 134. Air deflector 134 may be slideably insertable into air deflector receiver 245 creating a flow-path. Air deflector 134 may deflect air blowing in upward direction outwardly away from second side 114 of frame 110. Optimally-angleable solar powered air blowing systems 100 may then blow air into an interior volume thereby providing a self-powered air blower for circulating air flow 132 throughout interior volume 165.

As may further be seen in FIG. 1, optimally-angleable solar powered air blowing system 100 is portable. In one embodiment, frame 110 may comprise lightweight ferrous material (such as metal or alloy thereof for example steel). In another embodiment, frame 110 may comprise lightweight durable plastic. Movable handle 125 mountable to second side 114 of frame 110 is able to be rotated though an arc of less than 180 degrees. Movable handle 125, when rotated downwardly, is able to provide a standing means to support optimally-angleable solar powered air blowing system 100 on a horizontal-surface. As shown, frame 110 may optimally positioned in front of door 160 comprising a transparent or translucent panel for solar panel solar panel 120 mounted to first side 112 of frame 110 to capture solar energy 105 emitted by sun 102. Preferably, movable handle 125 is positioned in a manner to support frame 110 such that first side 112 of frame 110 comprises an angle of approximately 30 degrees for optimal positionability toward sun 102.

Figure 2A:
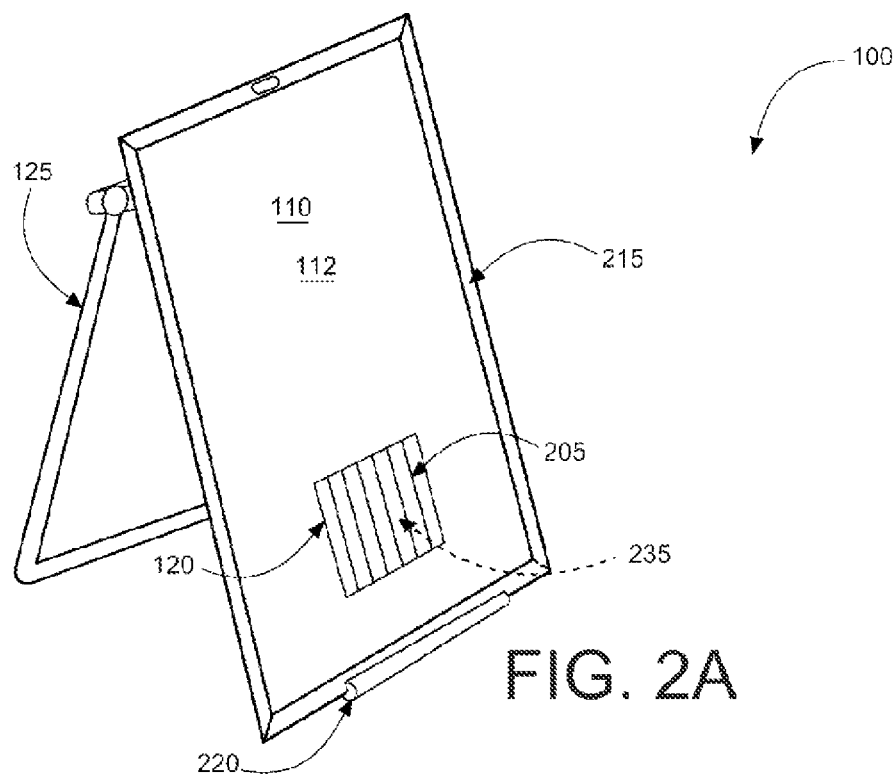
FIG. 2A is a perspective view illustrating the optimally-angleable solar powered air system comprising a fan for blowing air into an interior volume according to an embodiment of the present invention of FIG. 1.

Referring now to FIG. 2A showing a perspective view illustrating optimally-angleable solar powered air system 100 comprising frame 110 having first side 112 comprising solar panel 120 accoryoutubeyyouding to an embodiment of the present invention of FIG. 1. As shown, solar panel 120 may be mounted to first side 112 of frame 110 and may comprise solar cells 205. In one embodiment, solar cells 205 may use solar energy converters 235 installable adjacent to solar panel 120 for converting solar energy 105 directly into electricity by the photovoltaic effect. Solar panel 120 may be affixed to first side 112 of frame 110 via conventional mounting means, such as use of adhesives, bonding substances, bolts and screws, or the like.

In continuing to refer to FIG. 2A, frame 110 may comprise hem 215. Hem 215 may comprise a protector barrier fixedly mounted around perimeter of frame 110 thereby providing a smoother and 'safer' surface around the 4 corners of frame 110. Hem 215 may allow user 140 to comfortably handle frame 110 thereby providing improved portability of optimally-angleable solar powered air systems 100. In one embodiment, hem 215 may comprise a width of approximately 0.5″ for minimizing hand injury to user 140 when handling frame 110. It should be noted that first side 112 of frame 110 may comprise black heat absorbent material for additional absorption of solar energy 105 provided by sun 102.

In still referring to FIG. 2A, frame 110 may comprise pad 220. As shown, pad 220 may be installed to a bottom portion of frame 110. Pad 220 may comprise a cushioned barrier between the bottom of frame 110 and a ground surface. Pad 220 is intended to prevent damage to the ground surface should frame 110 be pushed or pulled over the ground surface intentionally or unintentionally by user 140. In one embodiment, pad 220 may comprise foam. In other embodiments, pad 220 may comprise rubber, leather, soft plastic, or other cushiony material for minimizing abrasion. Pad 220 also increases stability of frame 110 when 'standing'.

Figure 2B:
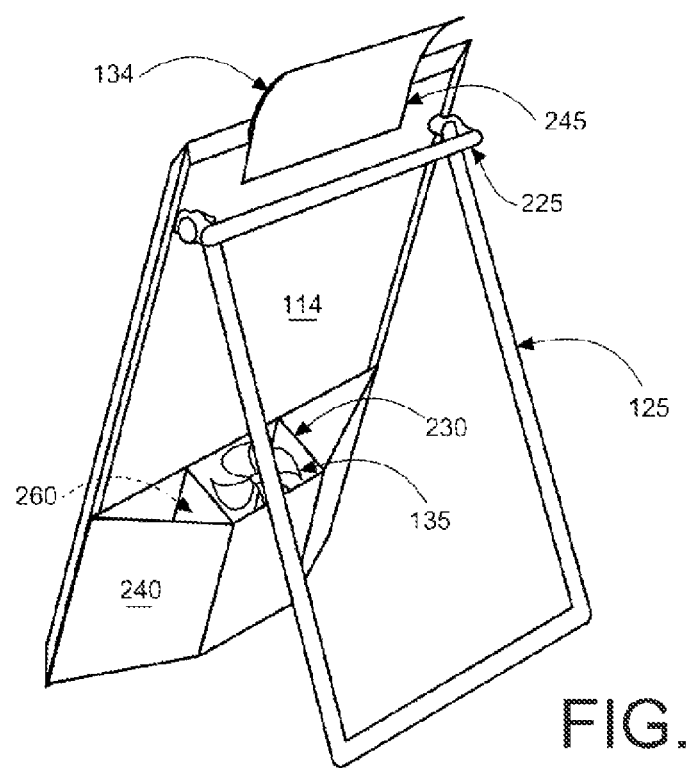
FIG. 2B is a perspective view illustrating the optimally-angleable solar powered air system comprising a frame having a first side comprising a solar panel according to an embodiment of the present invention of FIG. 1.

Referring now to FIG. 2B showing a perspective view illustrating optimally-angleable solar powered air system 100 showing second side 114 of frame 110 comprising fan 135 for blowing air flow 132 into interior volume 165 according to an embodiment of the present invention of FIG. 1. As shown, fan housing 230 may be mounted to second side 114 of frame 110 relative in location on frame 110 to solar panel 120 mounted to first side 112 of frame 110. Fan housing 230 may integrally contain fan 135 and power supply 260. Additionally, fan housing cover 240 envelopes fan housing 230 thereby providing additional protection to/from fan 135 and to power supply 260. Fan housing 230 may be installable to second side 114 of frame 110 via a plurality of screws and bolts. Alternatively, fan housing 230 may be mounted to second side 114 of frame 110 via a plurality of tracks comprising a receiver for a rear of fan housing 230. Fan housing cover 240 may comprise a band which may be wrapped around fan housing 230. Alternatively, fan housing cover 240 may comprise lightweight plastic which may be removably mounted around fan housing 230. Preferably, fan housing 230 is located toward a bottom of second side 114 of frame 110 adjacent solar panel 120 of first side 112 of frame 110.

In continuing to refer to FIG. 2B, movable handle 125, stationary handle 225, and air deflector receiver 245 are shown located on second side 114 of frame 110. Starting at the top, air deflector receiver 245 may be securely mounted to second side 114 of frame 110 above fan 135 of air blowing and directing assembly 130 for removably storing air deflector 134. In one embodiment, air deflector receiver 245 may comprise a pair of tracks for slideably receiving air deflector 134. As shown, air deflector 134 may comprise a ramp for directing air flow 132 outward from second side 114 of frame 110. Air deflector receiver 245 may comprise lightweight plastic or metal material. Other equivalent materials and orientations of the components may be used and still fall within the scope of the present disclosure.

In continuing to refer to FIG. 2B, stationary handle 225 is shown comprising a vertical bar or rod running along the top of second side 114 of frame 110. In such a manner, stationary handle 225 may provide user 140 with a gripping surface when transporting optimally-angleable solar powered air systems 100. Further, movable handle 125 may be removably mountable to second side 114 of frame 110.

In one embodiment, movable handle 125 may be mounted to frame 110 near stationary handle 225 via a pair of pivoters each hinged to opposing horizontal ends of second side 114 of frame 110. Movable handle 125 is able to be rotated though an arc of less than 180 degrees via the pivoters. Alternate embodiments may allow for less or more rotation; however less than 180 is preferred. Movable handle 125, when rotated downwardly, is able to provide a standing means to support frame 110. In addition, movable handle 125, when rotated upwardly, is able to provide a hanging means to support optimally-angleable solar powered air blowing system 100 against a vertical-surface (as shown best in FIGS. 5B and 5C). Lastly, movable handle 125, when rotated inwardly such that movable handle 125 is flush against second side 114 of frame 110, enables optimally-angleable solar powered air blowing system 100 to be easily storable in a folded-condition. This may allow optimally-angleable solar powered air blowing system 100 to be very compact and portable for transition between 'in-use' condition 150 and storage.

Figure 3A:
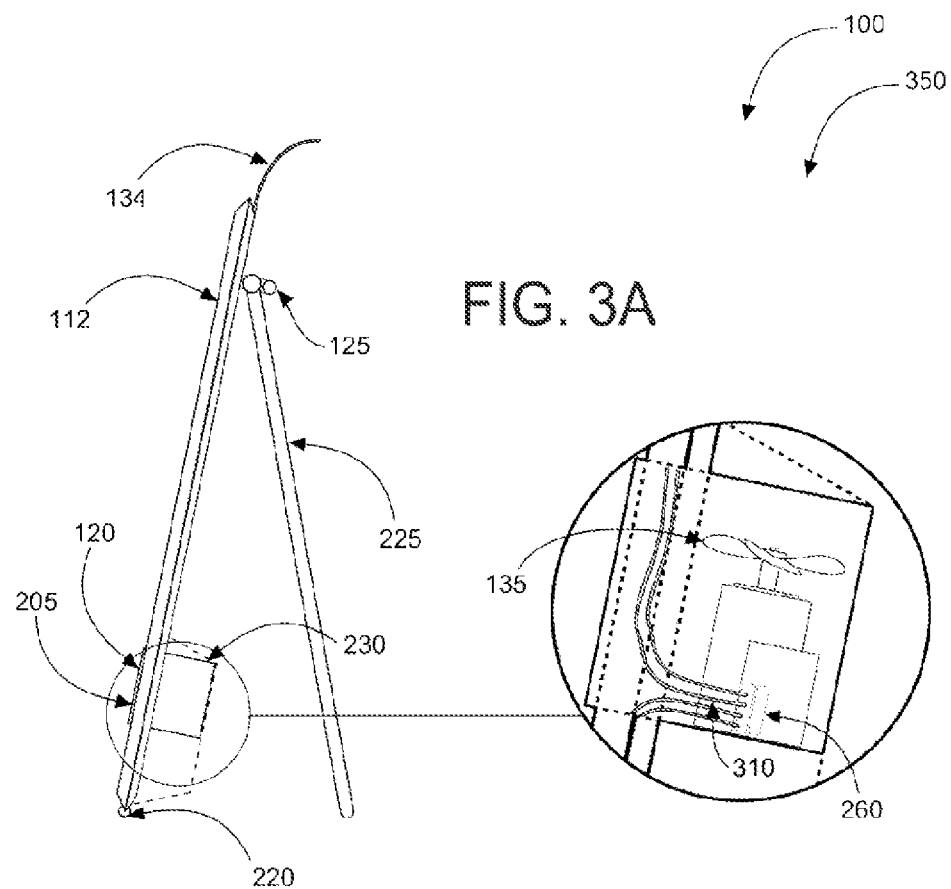
FIG. 3A is a close-up view of an air blowing and directing assembly mounted to the second side of the frame according to an embodiment of the present invention of FIGS. 1-2.

Referring now to FIG. 3A showing a side perspective illustrating a close-up view of air blowing and directing assembly 130 mounted toward a bottom of second side 114 of frame 110 according to an embodiment of the present invention of FIGS. 1-2C. In one embodiment, air blowing and directing assembly 130 may comprise fan housing 230, fan 135, fan housing cover 240, solar energy converter 235, power supply 260, and air deflector 134. As shown, fan 135 may be securely mounted within confines of fan housing 230. Further, solar energy cable 310 may connect solar energy converter 235 of solar cells 205 mounted to solar panel 120 to power supply 260 of fan 135. As such, power supply 260 is in direct communication with solar panel 120 via solar energy cable 310 which may run through frame 110.

Figure 3B:
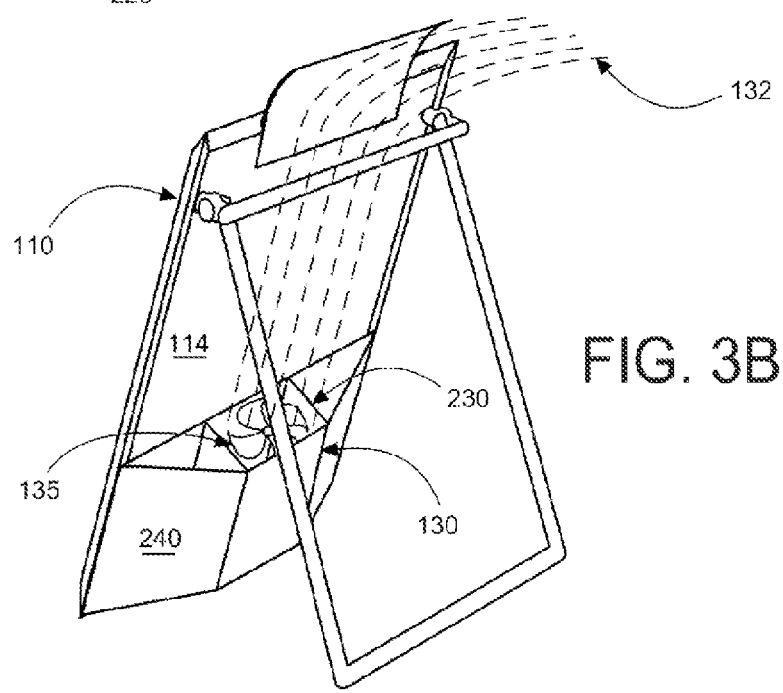
FIG. 3B is a perspective view illustrating the fan of the air blowing and directing assembly in an 'in-use' condition blowing air upward toward an air deflector thereby projecting the air outwardly into the interior volume according to an embodiment of the present invention of FIGS. 1-2.

Referring now to FIG. 3B, a perspective view illustrating fan 135 of air blowing and directing assembly 130 during 'in-use' condition 350 blowing air flow 132 upwardly towards (and deflectively past) air deflector 134 thereby projecting air flow 132 outwardly into interior volume 165 according to an embodiment of the present invention of FIGS. 1-2B. As previously discussed, solar energy 105 may be converted into usable energy by solar energy converter 235. The usable energy may then be used to power fan 135 during 'in-use' condition 350. In one embodiment of the present invention, fan 135 may operate at a speed proportionate to a quantity of solar energy 105 collected by solar panel 120. In such a manner, during times of peak sun light (ie. midday), solar panel 120 will likely collect a maximum quantity of solar energy 105 and fan 135 will operate at maximum intensity. However, during times of low sun light (ie. night time), solar panel 120 will not collect a large quantity of solar energy 105 and fan 135 will operate at minimal intensity or not at all. Other embodiments may be controlled via electro-mechanical switches or the like.

In a preferred embodiment of the present invention, fan 135 of air blowing and directing assembly 130 may comprise a 12 volt fan. In this embodiment, solar energy converter 235 may convert solar energy 105 into usable-power comprising 12 volt electricity for operating fan 135 comprising the 12 volt fan.

Figure 4:
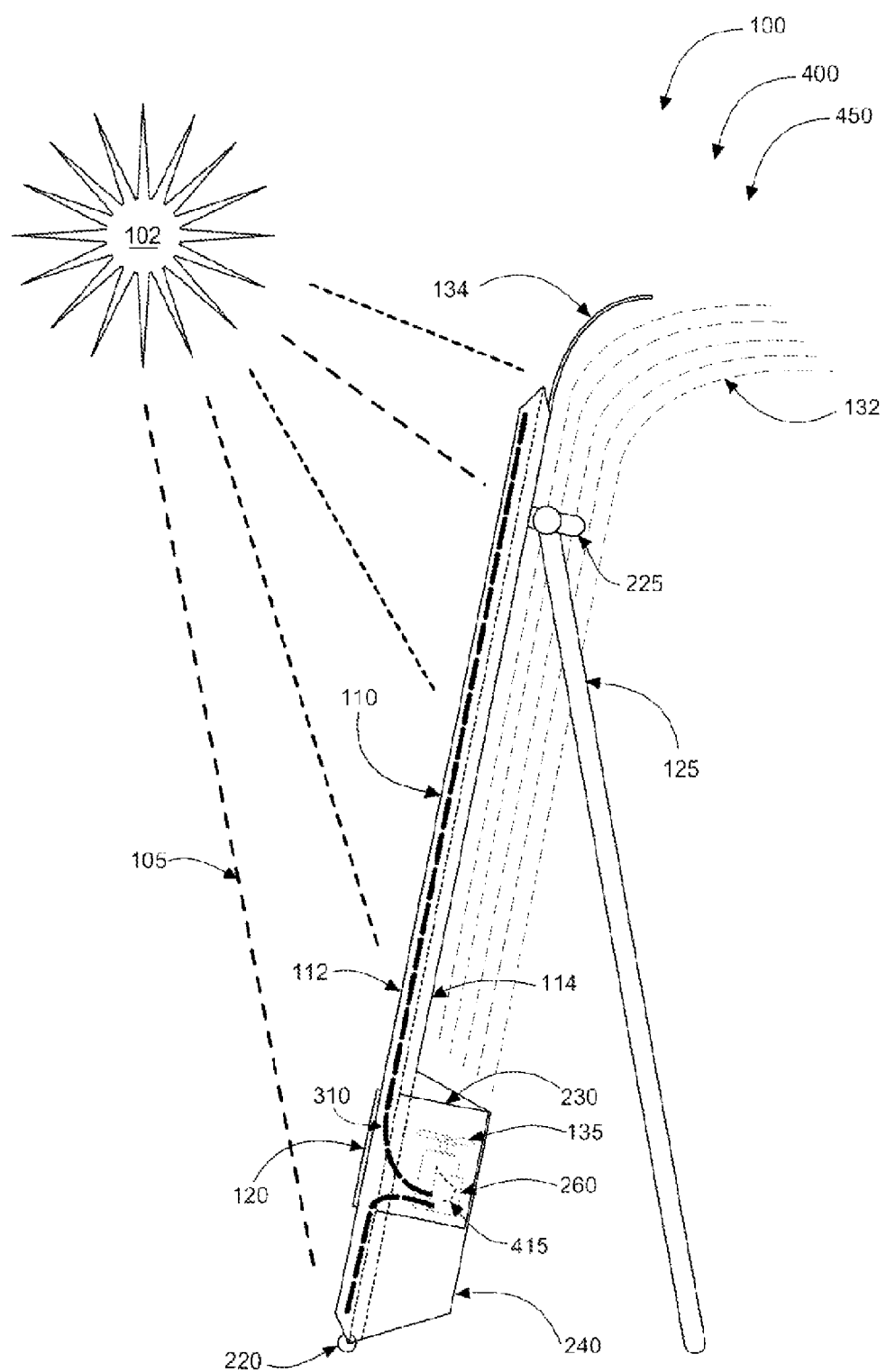
FIG. 4 is a perspective view illustrating a solar energy process for powering the optimally-angleable solar powered air system during an 'in-use' condition according to an embodiment of the present invention of FIGS. 1-3.

Referring now to FIG. 4 showing a perspective view illustrating solar energy process 400 for powering optimally-angleable solar powered air systems 100 during 'in-use' condition 450 according to an embodiment of the present invention of FIGS. 1-3B.

Movable handle 125 is shown mounted to second side 114 of frame 110 and may provide a stand for frame 110. As shown, sun 102 emits solar energy 105 via sun light (rays) that shine(s) onto solar panel 120 mounted to first side 112 of frame 110. Solar panel 120 comprises plurality of solar cells 205, and solar cells 205 may be in communication with solar energy converter 235. Solar energy converter 235 of solar cells 205 are in electric communication with solar energy cable 310 which thereby delivers usable power (converted solar energy 105) to power supply 260 of air blowing and directing assembly 130. During 'in-use' condition 450, power supply 260 may deliver usable power to a motor of fan 135 via power cable 415. Power cable 415 may comprise at least one wire in electric communication with power supply 260. In one embodiment, power supply 260 may comprise at least one rechargeable battery. The rechargeable battery may be rechargeably filled with usable power via solar energy 105 converted into usable power by solar energy converter 235. In another embodiment, power supply 260 may comprise a non-rechargeable battery. In this way the present invention may be used separate and apart from utilities provided by the grid.

Figure 5A:
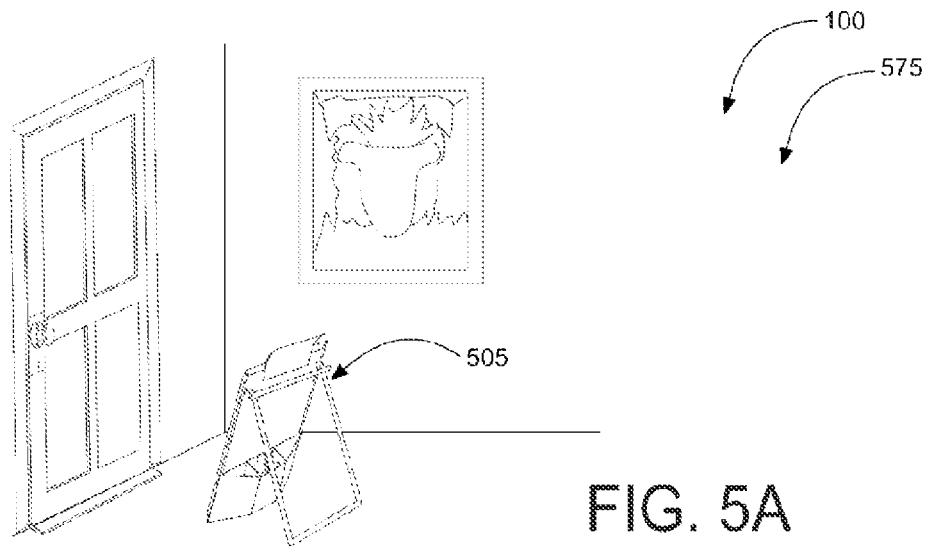
FIG. 5A is a perspective view illustrating a stand version of the optimally-angleable solar powered air system according to an embodiment of the present invention of FIGS. 1-4.

Referring now to FIG. 5A showing a perspective view illustrating stand version 505 of optimally-angleable solar powered air systems 100 according to an embodiment of the present invention of FIGS. 1-4. Movable handle 125 is shown mounted to second side 114 of frame 110 and may provide a stand for frame 110. Movable handle 125 may be user-manipulable such that optimally-angleable solar powered air systems 100 may stand at an angle such that first side 112 of frame 110 has a slight upward angle optimal for catching solar energy 105 emitted by sun 102. It may be appreciated that movable handle 125 may be opened or closed to increase or decrease the angle of first side 112 of frame 110 to broaden use of optimally-angleable solar powered air systems 100. As shown in FIG. 5A, frame 110 of optimally-angleable solar powered air systems 100 may be positioned and supported upright by movable handle 125 such that solar panel 120 mounted to first side 112 of frame 110 faces solar energy 105 emitted by sun 102 (ie. in front of a door having glass panels). Alternatively it should be noted that stand version 505 of optimally-angleable solar powered air systems 100 may be positioned in front of any vertical-surface that is translucent.

Figure 5B:
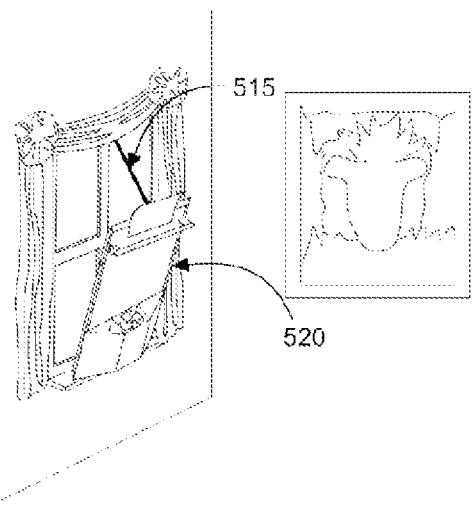
FIG. 5B is a perspective view illustrating a window version of the optimally-angleable solar powered air system according to an embodiment of the present invention.

Referring now to FIG. 5B showing a perspective view illustrating window version 520 of optimally-angleable solar powered air systems 100 according to an embodiment of the present invention. As shown, optimally-angleable solar powered air systems 100 may further comprise strap 515. Strap 515 may be useful for hanging frame 110 to a vertical-surface that is translucent. As shown in FIG. 5B, the vertical surface that is translucent may comprise window 522. In such a manner, frame 110 may be hung from a user-inserted mountable fastener, such as an eyelet screw, via strap 515, which may hang from the user-inserted mountable fastener in support of frame 110.

Figure 5C:
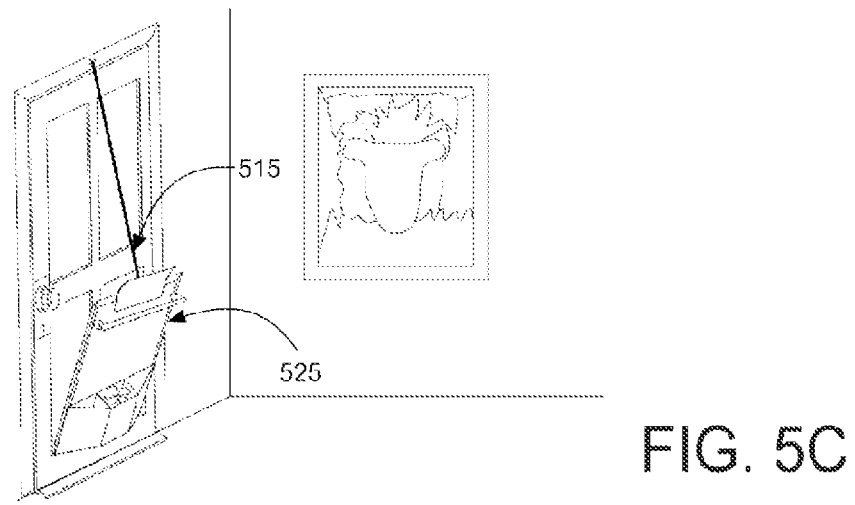
FIG. 5C is a perspective view illustrating a door version of the optimally-angleable solar powered air system according to an embodiment of the present invention.

Referring now to FIG. 5C showing a perspective view illustrating door version 525 of optimally-angleable solar powered air systems 100 according to an embodiment of the present invention. In this embodiment, the vertical surface that is translucent may comprise door 160. As shown, frame 110 may be mounted to door 160 via strap 515 in a manner similar to window version 520 as previously discussed.

In continuing to refer to FIGS. 5B and 5C, strap 515 may comprise varying lengths to accommodate different vertical surfaces that are translucent. It should be noted that frame 110 is hangable to the vertical-surface via strap 515 such that first side 112 of frame 110 is angled at approximately 30 degrees for optimal absorption of solar energy 105 by solar panel 120. The angle of first side 112 of frame 110 is user-adjustable by shortening or lengthening strap 515.

Referring generally now to the drawings FIGS. 1-5C, in a preferred embodiment optimally-angleable solar powered air systems 100 may comprise frame 110. Frame 110 may have first side 112 comprising black heat absorbent material and second side 114 comprising, in part, air blowing and directing assembly 130. Air blowing and directing assembly 130 may comprise fan housing 230, fan 135 comprising a 12 volt fan, fan housing cover 240 comprising a snap-on cover, solar energy converter 235, power supply 260, and air deflector 134. Optimally-angleable solar powered air blowing systems 100 may comprise in combination frame 110 and air blowing and directing assembly 130. Air blowing and directing assembly 130 may comprise in operable combination fan housing 230, fan 135, fan housing cover 240, solar energy converter 235, power supply 260, and air deflector 134.

Frame 110 may further comprise solar panel 120, stationary handle 225, movable handle 125, air deflector receiver 245, and pad 220. Solar panel 120 may comprise solar cells 205 for receiving solar energy 105. Solar panel 120 may be mounted to first side 112 of frame 110. Stationary handle 225 may be affixed to second side 114 of frame 110. Further, movable handle 125 is removably mountable to second side 114 of frame 110 and is able to be rotated through an arc of less than 180 degrees. Movable handle 125, when rotated upwardly, is able to provide a hanging means to support optimally-angleable solar powered air blowing systems 100 against a vertical-surface. Movable handle 125, when rotated downwardly, is able to provide a standing means to support optimally-angleable solar powered air blowing systems 100 on a horizontal-surface. In addition, movable handle 125, when rotated inwardly such that movable handle 125 is flush against second side 114 of frame 110, may enable optimally-angleable solar powered air blowing systems 100 to be easily storable in a folded condition. Frame 110 may comprise in combination solar panel 120, stationary handle 225, movable handle 125, air deflector receiver 245, and pad(s) 220. Alternatively, strap 515 may be used to hang frame 110 of optimally-angleable solar powered air blowing systems 100 against a vertical-surface. Preferably, frame 110 is hangable to the vertical-surface via strap 515 such that first side 112 of frame 110 is angled at approximately 30 degrees for optimal absorption of solar energy 105 by solar panel 120.

In air blowing and directing assembly 130, air deflector receiver 245 is affixed to second side 114 of frame 110. Air deflector receiver 245 may comprise a pair of horizontally aligned tracks having a width equivalent to air deflector 134. Optimally-angleable solar powered air systems 100 may comprise pad(s) 220, each serving as a buffer between frame 110 and a ground surface. Pad(s) 220 may be installable to a bottom surface of frame 110. Fan housing 230 may comprise a secure enclosure which may contain fan 135, solar energy converter 235, and power supply 260. Fan housing 230 may be mounted to second side 114 of frame 110 relative in location on frame 110 to solar panel 120 mounted to first side 112 of frame 110. Fan housing cover 240 may envelope fan housing 230 thereby providing additional protection to fan 135 and its integral components. Fan housing cover 240 also protects individuals from injury that may be caused by contact.

Solar panel 120 may transfer solar energy 105 to solar energy converter 235, and solar energy converter 235 may convert solar energy 105 into a usable-power. In the preferred embodiment of the present invention, the usable-power may comprise 12 volt electricity for operating fan 135 comprising a 12 volt fan. Solar energy converter 235 may then transfer the usable-power to power supply 260, and the usable-power enables power supply 260 to provide operating power to fan 135 thereby causing fan 135, when activated, to blow air flow 132 in an upward direction towards air deflector 134. Air deflector 134 is slideably insertable into air deflector receiver 245 creating a flow-path, and air deflector 134 deflects air flow 132 blowing in the upward direction outwardly away from second side 114 of frame 110. It may be appreciated that optimally-angleable solar powered air blowing systems 100 may blow air flow 132 into interior volume 165 and may provide a self-powered air blower for cost-effectively circulating the air throughout interior volume 165 (such as a room inside a residential or commercial dwelling). The device is lightweight and portable thus may be moved between rooms as desired.

It should be noted that optimally-angleable solar powered air systems 100 may be sold as kit 575 comprising the following parts: frame 110 comprising solar panel 120, stationary handle 225, movable handle 125, air deflector receiver 245, and pad 220; air blowing and directing assembly 130 comprising fan housing 230, fan 135, fan housing cover 240, solar energy converter 235, power supply 260, and air deflector 134; and at least one set of user (installation and maintenance) instructions. Kit 575 may have instructions such that functional relationships are detailed in relation to the structure of the invention (such that the invention can be used, maintained, or the like in a preferred manner). Optimally-angleable solar powered air systems 100 may be manufactured and provided for sale in a wide variety of sizes, shapes and capacities for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different fan/powering combinations, parts may be sold separately, etc., may be sufficient.

Figure 6:
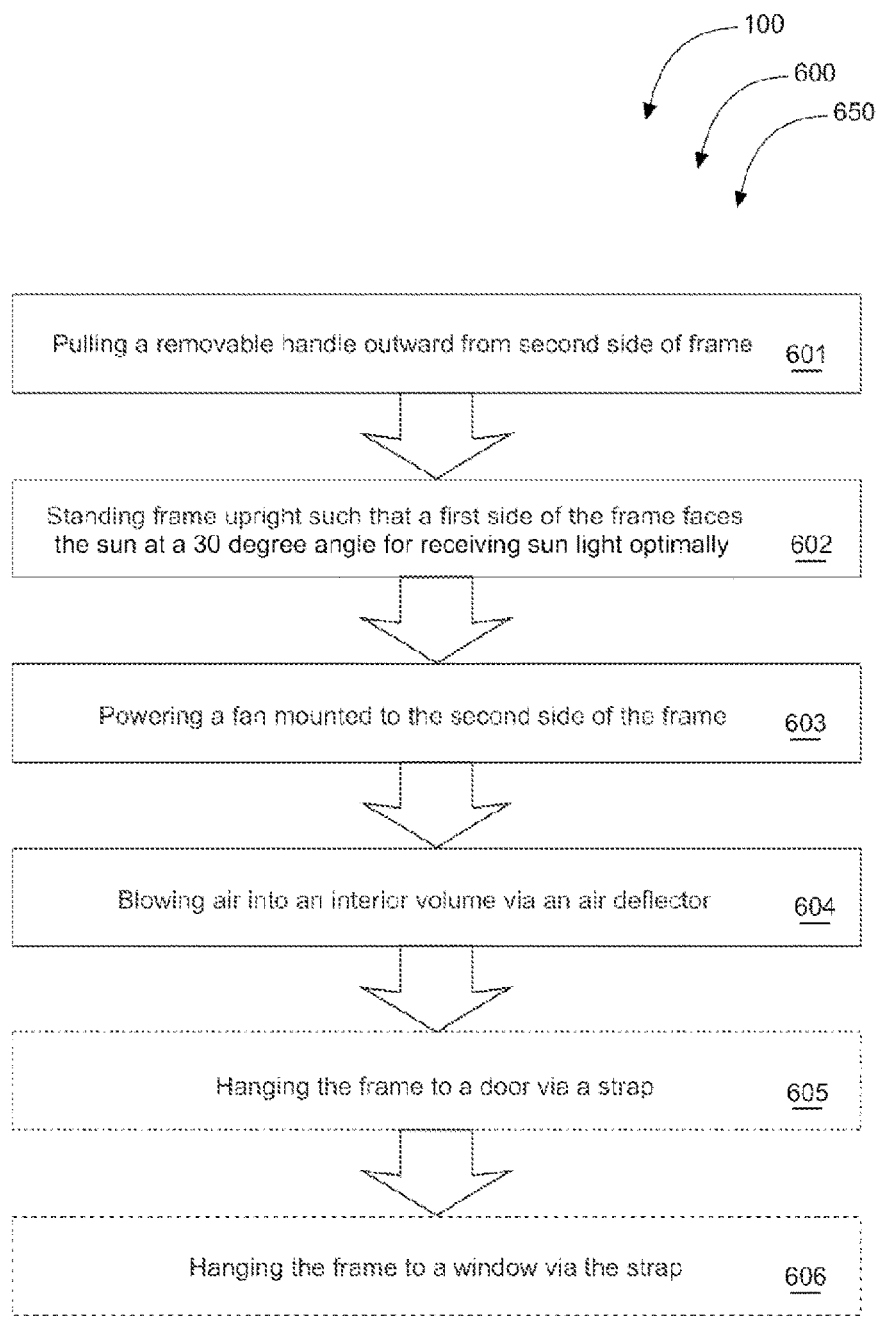
FIG. 6 is a flowchart illustrating a method of use for the optimally-angleable solar powered air system according to an embodiment of the present invention of FIGS. 1-5C.

Referring now to FIG. 6, showing flowchart 650 illustrating method of use 600 for optimally-angleable solar powered air systems 100 according to an embodiment of the present invention of FIGS. 1-5C.

As shown, method of use 600 may comprise the steps of: step one 601, pulling movable handle 125 outward from second side 114 of frame 110; step two 602, standing frame 110 upright such that first side 112 of frame 110 faces sun 102 at an angle of approximately 30 degrees for optimally capturing and receiving solar energy 105; step three 603, powering fan 135 mounted to second side 114 of frame 110; and step four 604, blowing air flow 132 into interior volume 165 via air deflector 134. Furthermore, method of use 600 of optimally-angleable solar powered air systems 100 may comprise optional steps of: step five 605, hanging frame 110 to door 160 via strap 515; and step six 606, hanging frame 110 to window 522 via strap 515.

It should be noted that steps five 605 and step six 606 are optional steps and may not be implemented in all cases. Optional steps of method 600 are illustrated using dotted lines in FIG. 6 so as to distinguish them from the other steps of method 600.

It should be noted that the steps described in the method of use can be carried out in many different orders according to user preference. The use of "step of" should not be interpreted as "step for", in the claims herein and is not intended to invoke the provisions of 35 U.S.C. §112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An optimally-angleable solar powered air blowing system comprising:
    a frame having a first side and a second side, said frame comprising;
        at least one solar panel, said at least one solar panel comprising a solar energy receiver;
        a stationary handle
        a movable handle;
        an air deflector receiver; and
        at least one pad;
    an air blowing and directing assembly comprising;
        a fan housing;
        at least one fan;
        a fan housing cover;
        a solar energy converter;
        a power supply; and
        an air deflector;
    wherein said optimally-angleable solar powered air blowing system comprising in combination said frame and said air blowing and directing assembly;
    wherein said frame comprises in combination said at least one solar panel, said stationary handle, said movable handle, said air deflector receiver, and said at least one pad;
    wherein said air blowing and directing assembly comprises in operable combination said fan housing, said at least one fan, said fan housing cover, said solar energy converter, said power supply, and said air deflector;
    wherein said at least one solar panel is mounted to said first side of said frame;
    wherein said stationary handle is affixed to said second side of said frame;
    wherein said movable handle is removably mountable to said second side of said frame;
    wherein said air deflector receiver is affixed to said second side of said frame;
    wherein said at least one pad comprises a buffer between said frame and a ground surface, said at least one pad installable to a bottom surface of said frame;
    wherein said fan housing contains said at least one fan, said solar energy converter, and said power supply;
    wherein said fan housing is mounted to said second side of said frame relative in location on said frame to said at least one solar panel mounted to said first side of said frame;
    wherein said fan housing cover envelopes said fan housing;

wherein said at least one solar panel is in wired communication with said solar energy converter via at least one solar energy cable;

wherein said solar energy converter is in wired communication with said power supply via at least one power cable;

wherein said at least one solar panel collects solar energy;

wherein said solar panel transfers said solar energy to said solar energy converter via said at least one solar energy cable;

wherein said solar energy converter converts said solar energy to into a usable-power;

wherein said solar energy converter transfers said usable-power to said power supply;

wherein said usable-power enables said power supply to provide operating power to said fan thereby causing said fan, when activated, to blow air in an upward direction towards said air deflector;

wherein said air deflector is slideably insertable into said air deflector receiver creating a flow-path;

wherein said air deflector deflects said air blowing in said upward direction outwardly away from said second side of said frame; and wherein said optimally-angleable solar powered air blowing system blows said air into an interior volume and provides a self-powered air blower for circulating said air throughout said interior volume.

2. The optimally-angleable solar powered air blowing system of claim 1 wherein said optimally-angleable solar powered air blowing system is portable.

3. The optimally-angleable solar powered air blowing system of claim 2 wherein said at least one fan operates at a speed proportionate to a quantity of said solar energy collected by said at least one solar panel.

4. The optimally-angleable solar powered air blowing system of claim 3 wherein said frame is constructed of lightweight material for ease of mobility of said optimally-angleable solar powered air blowing system.

5. The optimally-angleable solar powered air blowing system of claim 4 wherein a perimeter of said frame comprises a hem of approximately 0.5" for minimizing hand injury to a user when handling said frame.

6. The optimally-angleable solar powered air blowing system of claim 5 wherein said first side of said frame comprises black heat absorbent material.

7. The optimally-angleable solar powered air blowing system of claim 6 wherein said movable handle is able to be rotated though an arc of less than 180 degrees.

8. The optimally-angleable solar powered air blowing system of claim 7 wherein said movable handle, when rotated upwardly is able to provide a hanging means to support said optimally-angleable solar powered air blowing system against a vertical-surface.

9. The optimally-angleable solar powered air blowing system of claim 7 wherein said movable handle, when rotated downwardly is able to provide a standing means to support said optimally-angleable solar powered air blowing system on a horizontal-surface.

10. The optimally-angleable solar powered air blowing system of claim 6 wherein said movable handle, when rotated inwardly such that said movable handle is flush against said second side of said frame, enables said optimally-angleable solar powered air blowing system to be easily storable in a folded condition.

11. The optimally-angleable solar powered air blowing system of claim 8 wherein said frame comprises a strap for hanging said frame to said vertical-surface that is translucent.

12. The optimally-angleable solar powered air blowing system of claim 11 wherein said frame is hangable to said vertical-surface via said strap such that said first side of said frame is angled at approximately 30 degrees for optimal absorption of said solar energy by said at least one solar panel.

13. The optimally-angleable solar powered air blowing system of claim 12 wherein said vertical-surface that is translucent comprises a window.

14. The optimally-angleable solar powered air blowing system of claim 12 wherein said vertical-surface that is translucent comprises a door.

15. The optimally-angleable solar powered air blowing system of claim 4 wherein said at least one fan comprises a 12 volt fan.

16. The optimally-angleable solar powered air blowing system of claim 15 wherein said usable-power comprises 12 volt electricity for operating said 12 volt fan.

* * * * *